(12) United States Patent
Miller et al.

(10) Patent No.: US 11,754,414 B2
(45) Date of Patent: Sep. 12, 2023

(54) SYSTEMS AND METHODS TO PROVIDE LAST MILE ASSISTANCE TO A DELIVERY ROBOT

(71) Applicant: Ford Global Technologies, LLC, Dearborn, MI (US)

(72) Inventors: Justin Miller, Berkley, MI (US); Pavithra Madhavan, Windsor (CA); Sanghyun Hong, Ann Arbor, MI (US); Jianbo Lu, Northvile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 17/320,137

(22) Filed: May 13, 2021

(65) Prior Publication Data
US 2022/0364876 A1    Nov. 17, 2022

(51) Int. Cl.
*G01C 21/36*    (2006.01)
*G06Q 10/0832*    (2023.01)
(Continued)

(52) U.S. Cl.
CPC ....... *G01C 21/3647* (2013.01); *G05D 1/0234* (2013.01); *G05D 1/0246* (2013.01);
(Continued)

(58) Field of Classification Search
CPC .............. G01C 21/3647; G01C 21/005; G01C 21/3826; G05D 1/0234; G05D 1/0246;
(Continued)

(56) References Cited

U.S. PATENT DOCUMENTS 9,911,341 B2    3/2018    Soundararajan et al.
10,514,690 B1   12/2019    Siegel et al.
(Continued)

FOREIGN PATENT DOCUMENTS

WO    2019055281 A2    3/2019

OTHER PUBLICATIONS

J. Chu "Navigation Method May Speed up Autonomous Last-Mile Delivery" (Nov. 2019).
Univrses "Last Mile Delivery Robots".

*Primary Examiner* — Yuen Wong
(74) *Attorney, Agent, or Firm* — Brandon Hicks; Eversheds Sutherland (US) LLP

(57) ABSTRACT

This disclosure is generally directed to generating travel route information that is interpretable by a delivery robot for traversing a last mile of a delivery. In an example embodiment, an individual captures a video clip while moving along a travel route that is preferred by the individual for use by the delivery robot. The video clip is converted into a digital route map that the delivery robot uses to reach a package drop-off location on the property. In another example embodiment, an individual captures an image of a portion of the property and appends oral instructions to reach the package drop-off location. The image and the oral instructions are converted into a digital route map for use by the delivery robot. In yet another example embodiment, markers affixed to a surface of a traversable area on the property are used by the delivery robot to reach the package drop-off location.

9 Claims, 7 Drawing Sheets

(51) Int. Cl.
 *G06K 7/14* (2006.01)
 *G05D 1/02* (2020.01)
(52) U.S. Cl.
 CPC ......... *G05D 1/0274* (2013.01); *G06K 7/1417* (2013.01); *G06Q 10/0832* (2013.01)
(58) Field of Classification Search
 CPC . G05D 1/0274; G06K 7/1417; G06Q 10/0832
 See application file for complete search history.

(56) References Cited

U.S. PATENT DOCUMENTS

| | | |
|---|---|---|
| 10,589,418 B2 | 3/2020 | Gordon-Carroll et al. |
| 10,621,448 B2 | 4/2020 | Schubert et al. |
| 2014/0330456 A1 | 11/2014 | Morales et al. |
| 2018/0137463 A1* | 5/2018 | Mattingly ............ G05D 1/0276 |
| 2020/0201354 A1 | 6/2020 | Beaurepaire et al. |

* cited by examiner

SYSTEMS AND METHODS TO PROVIDE LAST MILE ASSISTANCE TO A DELIVERY ROBOT

BACKGROUND

A delivery robot may include an onboard computer having information for executing what may be referred to as a "last mile" of a delivery route. Traversing the last mile generally involves the delivery robot moving from a road or a curb to a package drop-off location at a residence or a business. In the case of a residence, the last mile area may include a driveway, a lawn, and/or a walkway, and may also include various obstacles such as a mailbox, a curb, and a tree. In one conventional delivery operation, the delivery robot may travel across the lawn to reach the drop-off location. While doing so, the delivery robot may use various sensors to avoid colliding with objects on the lawn. In another conventional delivery operation, the delivery robot may be provided a pre-mapped route to follow when making the delivery. The pre-mapped route may be obtained by executing a pre-mapping procedure performed by another robot that is explicitly configured to execute the pre-mapping procedure ahead of time.

Both these delivery operations suffer from certain handicaps such as risk, cost, and time delays. The first delivery operation involves an element of risk, such as associated with the delivery robot causing damage to the lawn and objects that may be present on the lawn. The second delivery operation involves various costs, including costs associated with deploying the robot for executing the pre-mapping procedure. The cost associated with deploying the robot can be particularly high if the pre-mapping procedure has to be carried out upon a number of residences or businesses. In some cases, such pre-mapping may turn out to be unnecessary, such as when a potential customer whose location has been pre-mapped fails to make a purchase. Other costs associated with the pre-mapping procedure may be attributable to activities such as transporting the robot to the premises, setting up the robot at the premises, and time spent carrying out the procedure.

It is therefore desirable to address issues such as the ones described above with respect to last mile deliveries carried out by delivery robots.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
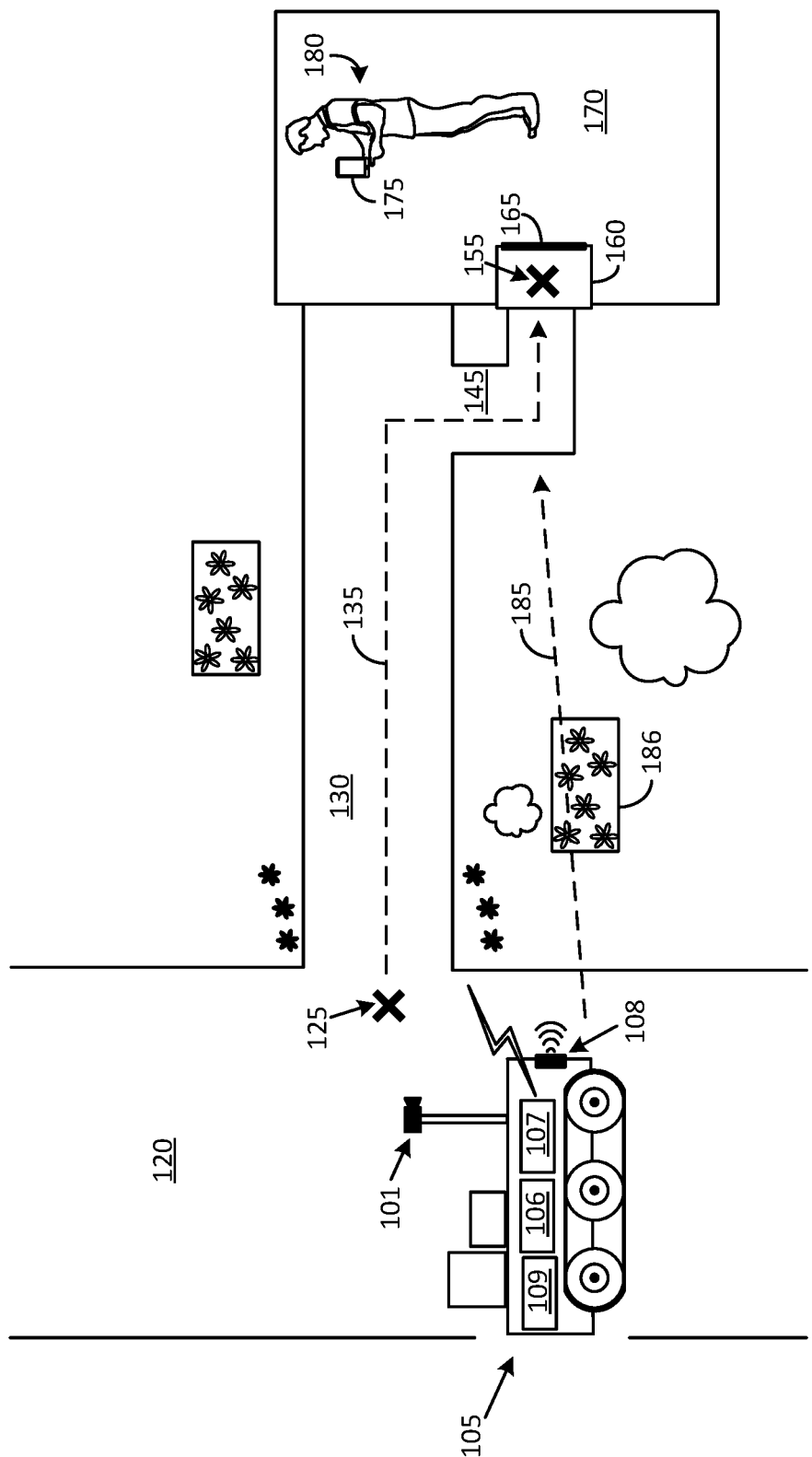
FIG. 1 illustrates an example scenario associated with a delivery robot in accordance with an embodiment of the disclosure.

In terms of a general overview, certain embodiments described in this disclosure are directed to systems and methods related to generating travel route information that is interpretable by a delivery robot for traversing a last mile of a package delivery route. In one example embodiment, an individual captures a video clip of a frontage of a property while moving along a desired travel route for use by a delivery robot. The video clip can be converted by a computer into a digital route map that the delivery robot uses to drop off a package at a package drop-off location on the property. In another example embodiment, an individual captures an image of a portion of the property and appends oral instructions to reach the package drop-off location on the property. The image and the oral instructions can be converted by a computer into a digital route map that the delivery robot can use to drop off the package at the package drop-off location. In yet another example embodiment, an individual identifies a travel route for a delivery robot by placing a set of markers on a surface of a traversable area at a package delivery location. The set of markers is trackable by the delivery robot to move from an origination spot at the package delivery location to the package drop-off spot at the package delivery location.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases that are used in this disclosure must be interpreted as referring to various objects and actions that are generally understood in various forms and equivalencies by persons of ordinary skill in the art. For example, the phrase "delivery robot" as used herein may be referred to alternatively in general parlance as a "self-driven vehicle" or a "robotic vehicle." As another example, words such as "path" and "route," and words such as "package" and "product" may be used interchangeably in this disclosure and should be understood as being equivalent to each other in the context of the description. The word "building" as used herein refers to any structure such as, for example, a residence, a house, a business facility, or a commercial establishment. The word "image" as used herein refers to any of various kinds of media such as, for example, a photograph captured by a photographic camera, a digital image produced by a digital camera, or a graphical/digitized representation of a view or an object. An "image" can be a part of a video clip. The phrase "video clip," "video recording," and "video stream" may be used interchangeably in this disclosure and should be understood as being equivalent to each other in the context of the description. Furthermore, it should be understood that the word "example" as used herein is intended to be non-exclusionary and non-limiting in nature.

FIG. 1 illustrates an example scenario associated with a delivery robot 105 in accordance with an embodiment of the disclosure. The delivery robot 105 may be any of various types of autonomous or semi-autonomous terrestrial robots used to deliver various types of items such as, for example, a pizza, an item of mail, a grocery item, or an object. The words "package" or "product" as used herein generically refers to any of such items. The delivery robot 105 may include various components such as, for example, a navigation system 106, a communication system 107, a computer 109, and various sensors and/or detectors. The sensors and/or detectors can include devices such as, for example, a video camera, a digital camera, an infrared camera, an object detector, a distance sensor, a proximity sensor, an audio sensor, a light detection and ranging (LIDAR) device, a radar device, and/or a sonar device that are communicatively coupled to the navigation system 106. The signals provided by the various sensors and/or detectors, such as, for example an image provided by a camera 101 or a signal provided by an ultrasonic sensor 108, may be evaluated by the computer 109 for determining a travel route for the delivery robot 105 when moving on the premises of the building 170.

The computer 109 may receive navigation assistance in the form of travel route information provided by an individual 180 in accordance with the disclosure. The individual 180 can be, for example, a resident of the building 170, an owner of the building 170, or any other person who is associated with the building 170 (lienholder, lessee, property caretaker, etc.). In this example, the individual 180 may provide the travel route information by use of a personal communications device 175, which can be any of various devices such as, for example, a smartphone, a tablet computer, a personal computer, or a wearable device. The travel route information provided by the individual 180 can complement sensor signals generated by the various sensors and detectors on the delivery robot 105, thereby minimizing an amount of time taken by the delivery robot 105 to make a delivery.

In addition to minimizing delivery time, the navigation assistance provided by the individual 180 may also help the delivery robot 105 avoid accidents that may possibly occur if the delivery robot 105 depended solely on the sensors and detectors. For example, the navigation assistance provided by the individual 180 can assist the navigation system 106 of the delivery robot 105 to plot a travel route that avoids travelling over a lawn area and risking damage to the turf and vegetation on the lawn area. As another example, the navigation assistance provided by the individual 180 may assist the navigation system 106 of the delivery robot 105 to avoid certain types of obstacles that may be undetectable or difficult to detect by the detectors and sensors. One example of such an obstacle is a portion of ground that is sodden, inclined, or contains loose gravel, which may be undetectable by the sensors and may pose traction issues for the wheels of the delivery robot 105.

The communication system 107 is configured to permit the delivery robot 105 to wirelessly communicate with the personal communications device 175 for obtaining navigation assistance, such as in the form of travel route information that may be used to traverse a frontage area of the property in which the building 170 is located. In the example scenario shown in FIG. 1, the frontage area may include a driveway 130 and a walkway 145. The walkway 145 leads from the driveway 130 to a stoop 160 in front of a door 165 of the building 170. The individual 180 may designate a package drop-off spot 155 on the stoop 160 for packages to be dropped off by the delivery robot 105.

A conventional delivery robot that is unassisted by the individual 180 may, in one scenario, opt to travel from a current location on a sidewalk 120 to the package drop-off spot 155 by using a shortest distance route 185. The shortest distance route 185 cuts across a lawn located adjacent to the driveway 130 and the individual 180 may find it objectionable for the delivery robot 105 to travel on the lawn and cause damage to the lawn, particularly, for example, if the lawn is wet and/or has been sodded recently. The delivery robot 105 may also cause other types of damage to vegetation and lawn ornaments such as, for example, damage to a flower bed 186 that is in the path of the shortest distance route 185. Consequently, in an example method of operation in accordance with the disclosure, the computer 109 of the delivery robot 105 uses travel route information provided by the individual 180 in order to avoid issues such as, for example, those that may be caused by using the shortest distance route 185.

In an example scenario, the travel route information is provided to the delivery robot 105 in the form of a digital route map that is interpretable by the computer 109. The digital route map may indicate a travel route 135 that is preferred by the individual 180 for receiving packages delivered by the delivery robot 105. The travel route 135 extends along the driveway 130 and the walkway 145 from an origination spot 125 on the sidewalk 120 to the package drop-off spot 155 on the stoop 160.

Figure 2:
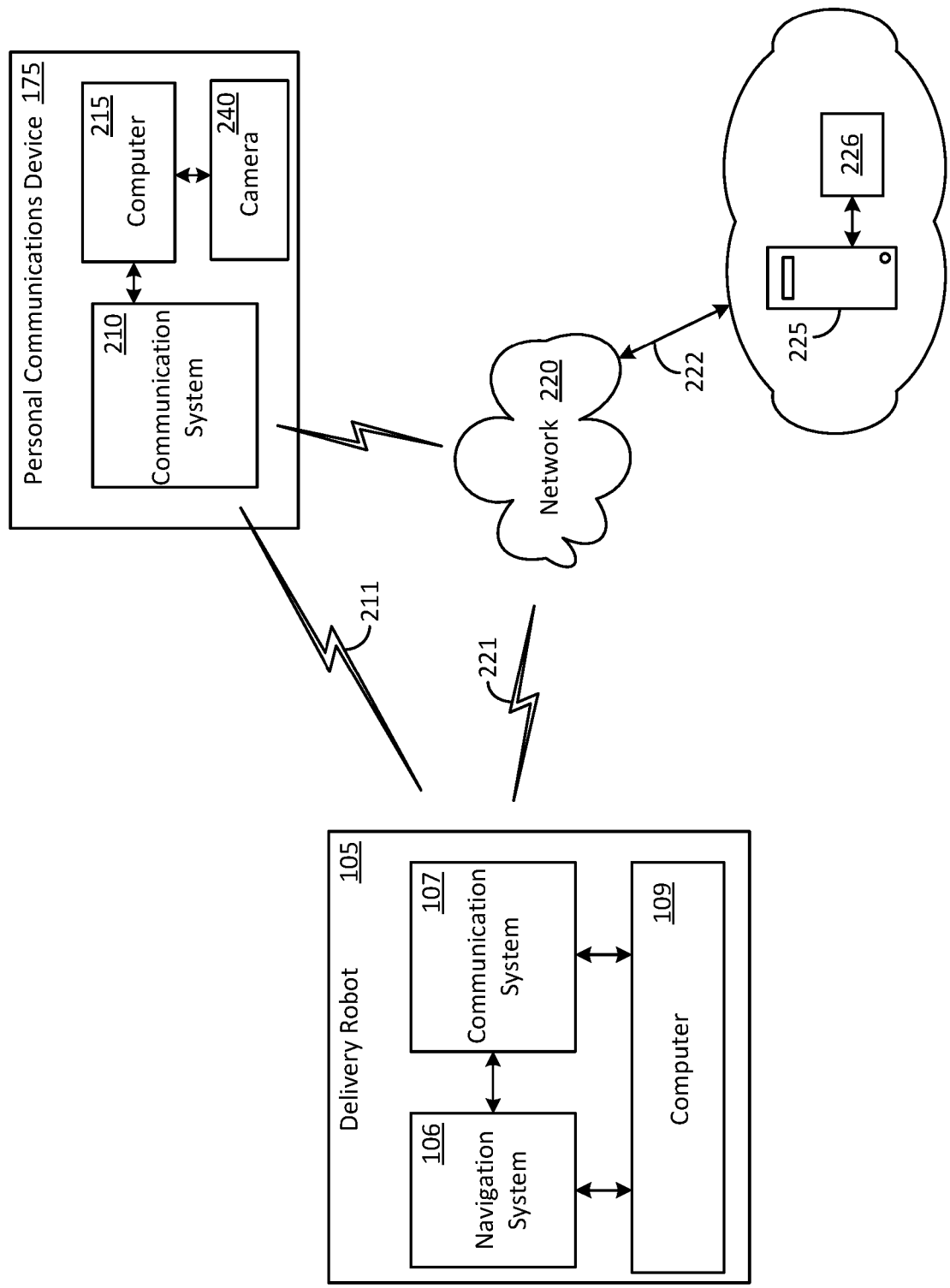
FIG. 2 shows some example components that may be included in a delivery robot and other objects in accordance with an embodiment of the disclosure.

FIG. 2 shows some example components that may be included in the delivery robot 105 and other objects, in accordance with an embodiment of the disclosure. As described above, the delivery robot 105 can include the computer 109, the navigation system 106, and the communication system 107. The computer 109 is communicatively coupled to the communication system 107 and the navigation system 106 for controlling various operations of the delivery robot 105. The computer 109 may use signals provided by the navigation system 106 to operate hardware such as a drive mechanism (motor, battery, brakes, etc.) and a steering mechanism for moving the delivery robot 105, such as along the travel route 135.

The communication system 107 is configured to communicate with the personal communications device 175 of the individual 180 by using a wireless link 211 that may be implemented using any of various forms of wireless technologies such as, for example, cellular communications, WiFi communications, and optical communications. The communication system 107 may also communicate with the personal communications device 175 and/or a server computer 225 via a wireless link 221 and a network 220. The wireless link 221 may be implemented by using any of various forms of wireless technologies such as, for example, the ones used for the wireless link 211.

The network 220 may include any one, or a combination of networks, such as, for example, a wide area network (WAN), a telephone network, a cellular network, a cable network, a wireless network, and/or private/public networks such as the Internet. For example, the network 220 may support communication technologies such as TCP/IP, Bluetooth, cellular, near-field communication (NFC), Wi-Fi, Wi-Fi direct, machine-to-machine communication, and/or man-to-machine communication. The communication link 222 that supports communications between the server computer 225 and the network 220 may incorporate one or more of various types of wired and/or wireless technologies used for communications. The server computer 225 may be coupled to a storage device 226, which can be configured as a cloud storage device.

The personal communications device 175 of the individual 180 can include a communication system 210, a computer 215, and a camera 240. The communication system 210 is configured to communicate with the communication system 107 in the delivery robot 105 (via the wireless link 211) and/or to communicate with the server computer 225 via the network 220. The computer 215 may perform various operations in accordance with the disclosure, including cooperating with the computer 109 of the delivery robot 105 to provide last mile assistance to the delivery robot 105 for delivering a package.

The camera 240 is configured to capture and provide images to the computer 215 to enable the computer 215 to provide last mile assistance to the delivery robot in accordance with the disclosure. In one example implementation, the camera 240 is a digital camera that provides digital images to the computer 215 for generating travel route information that may be used by the delivery robot 105 when executing a package delivery. In another example implementation, the camera 240 is a video camera that provides video clips and associated audio to the computer 215 for generating travel route information that may be used by the delivery robot 105 when executing a package delivery.

Figure 3:
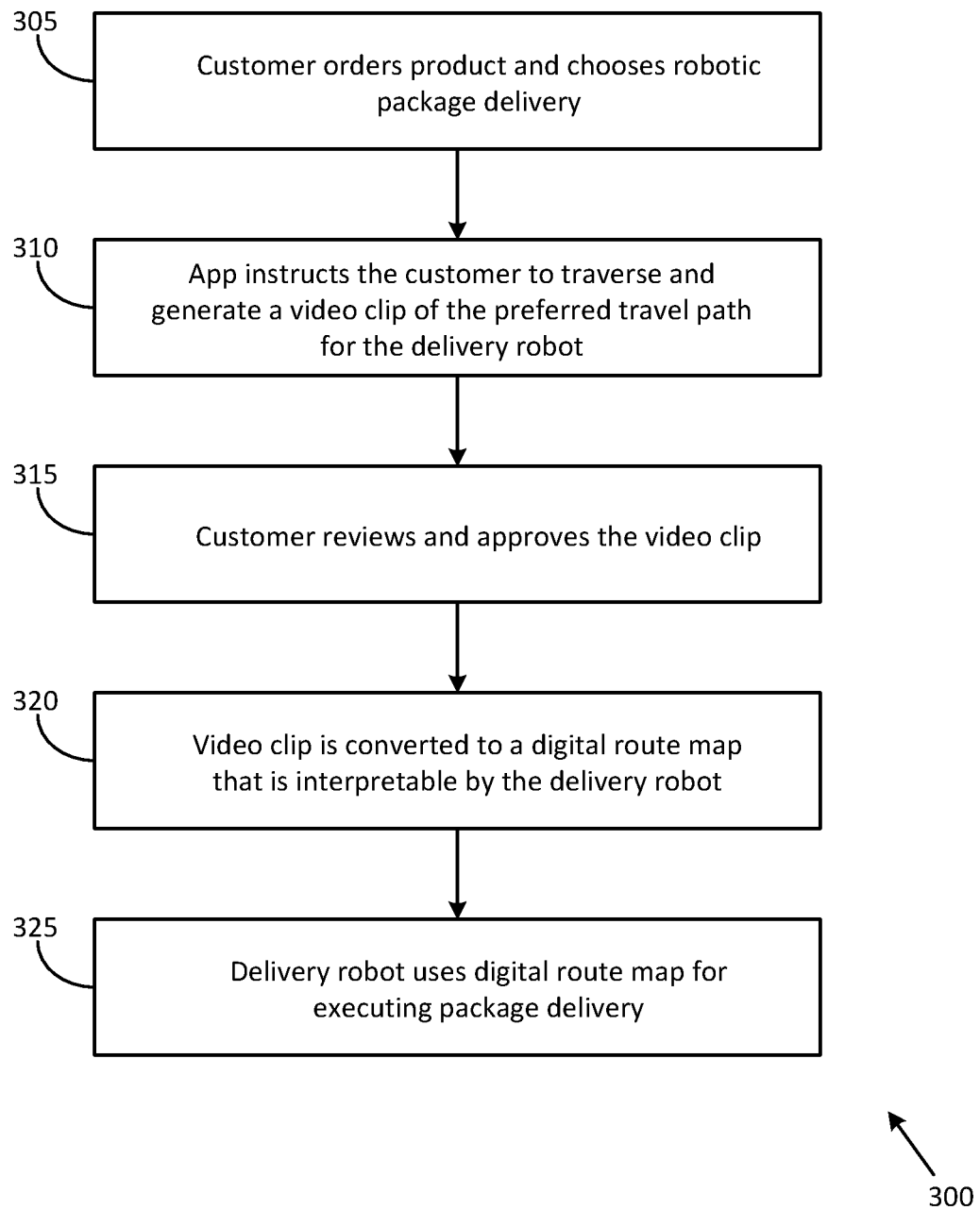
FIG. 3 shows a flowchart of a method to provide travel route information to a delivery robot in accordance with an embodiment of the disclosure.

FIG. 3 shows a flowchart 300 of a method to provide travel route information to the delivery robot 105 in accordance with an embodiment of the disclosure. The flowchart 300 illustrates a sequence of operations that can be executed by various entities such as, for example, the individual 180, the computer 215 in the personal communications device 175, and the server computer 225. Devices such as the computer 215 in the personal communications device 175 and the server computer 225 can execute operations by using hardware, software, or a combination thereof. In the context of software, the operations represent computer-executable instructions stored on one or more non-transitory computer-readable media (such as a memory in the computer 215 of the personal communications device 175a memory in the computer 109 of the delivery robot 105, and a memory in the server computer 225), that, when executed by one or more processors (such as a processor in the computer 215 of the personal communications device 175, a processor in the computer 109 of the delivery robot 105, and a processor in the server computer 225 respectively), perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 300 may be carried out by using an application that may be downloaded into the computer 215 of the personal communications device 175, the computer 109 of the delivery robot 105, or the server computer 225.

At block 305, a customer purchases a product and opts for robotic delivery service. In the example scenario shown in FIG. 1, the individual 180, who is the customer, may perform this action by entering information into a software application in the personal communications device 175. In an example case, the software application may be provided by a vendor such as, Amazon®, for example, and the individual 180 may click on a check box to opt for robotic delivery service.

At block 310, the software application may display a message upon a display screen of the personal communications device 175 seeking last mile assistance from the individual 180. In an exemplary embodiment, the last mile assistance may be provided in the form of travel route information that can assist the delivery robot 105 traverse a frontage area of the property in which the building 170 is located. In addition to minimizing delivery time, the travel route information provided by the individual 180 may also help the delivery robot 105 avoid accidents that may possibly occur if the delivery robot 105 depended solely on the sensors and detectors provided in the delivery robot 105.

The individual 180 may respond to the message seeking last mile assistance by requesting instructions to do so. The software application then provides guidance to generate the travel route information. In an example implementation, the guidance may be provided to the individual 180 in the form of step-by-step instructions to identify a travel route that the individual 180 prefers for travel by the delivery robot 105 when delivering the purchased product. The step-by-step instructions may instruct the individual 180 to walk along the preferred travel route and capture a video clip of the travel route while doing so. The video clip may be captured by using any suitable recording device such as, for example, a video camera or the camera 240 in the personal communications device 175.

In one example case, the software application may recommend that the recording device be held at a certain angle and at a certain height above the ground that may mimic a view as perceived by the camera 101 mounted upon the delivery robot 105. In addition to, or in lieu of, the video clip, the individual 180 may be instructed to capture one or more images of certain areas of the travel route. These images may assist the delivery robot 105 generate a digital route map that can be used by the delivery robot 105 to deliver the package. Generating the digital route map by using an image may include analyzing and/or identifying surfaces (such as, for example, a gravel path or a pothole) and various objects (such as, for example, a light post, a curb or some shrubbery). The individual 180 may also be requested to provide oral instructions that may be associated with an image, and/or to provide an audio commentary or oral instructions when generating the video clip.

At block 315, the individual 180 may review the video clip, re-record the video clip if found unsatisfactory, and approve the video clip (or image) for submission to the software application for further action.

At block 320, the video clip (and/or images) is converted into a digital route map that is interpretable by the delivery robot 105. In one implementation in accordance with the disclosure, the conversion is performed in an online mode of operation by the computer 215 in the personal communications device 175. In another implementation in accordance with the disclosure, the personal communications device 175 may transmit the video clip (and/or images) to another device, such as, for example, the computer 109 in the delivery robot 105 and/or the server computer 225, which perform the conversion in an offline mode of operation. The video clip and/or images can be converted into a digital route map using various techniques.

In one example technique, the video clip and/or image is provided to the computer 240 in the form of a metrological feature map. The computer 240 converts the metrological feature map into a topological map, which is operative as the digital route map. In another example technique, contextual content present in an image or in the video clip, such as, for example, a landmark or a portion of the building 170, may be interpreted by the computer 215 when generating the digital route map. Various other techniques are described below.

The digital route map may be stored in the personal communications device 175, the delivery robot 105, and/or the server computer 225 for various purposes. In an example scenario, the stored digital route map be accessed, modified, and/or deleted at a later instant in time. Modification of a video clip or deleting of a video clip may be carried out for example, if some aspects of the travel route have changed (a new walkway path is constructed, a tree is planted, etc.) or the package drop-off spot 155 is changed.

At block 325, the delivery robot 105 uses the digital route map to execute the package delivery. The digital route map may be made available to the delivery robot 105 via uploading of the digital route map by the computer 215 in the personal communications device 175 at the time of purchase of the product (along with a purchase order, for example) and/or may be fetched by the delivery robot 105 from the server computer 225 prior to, or at the time of, delivery of the product. In an example embodiment, the digital route map may be integrated into a satellite image, an aerial photograph, or a navigation aid. The integration may be carried out via an overlay procedure.

The delivery robot 105 may launch the digital route map when the delivery robot 105 is located at the origination spot 125. The delivery robot 105 may then move in coordination with the digital route map in a real time mode of operation. Audio cues, if provided may be interpreted and executed in real time as well. In some cases, metadata associated with the video clip may be extracted and used along with the digital route map. The metadata can include, for example GPS information, internal measurement unit (IMU) parameters, and camera intrinsic settings. Camera intrinsic settings can include, for example, focal length settings, aperture settings, and video capture speed of the camera 240 when the personal communications device 175 is used for generating a video clip or an image.

Figure 4:
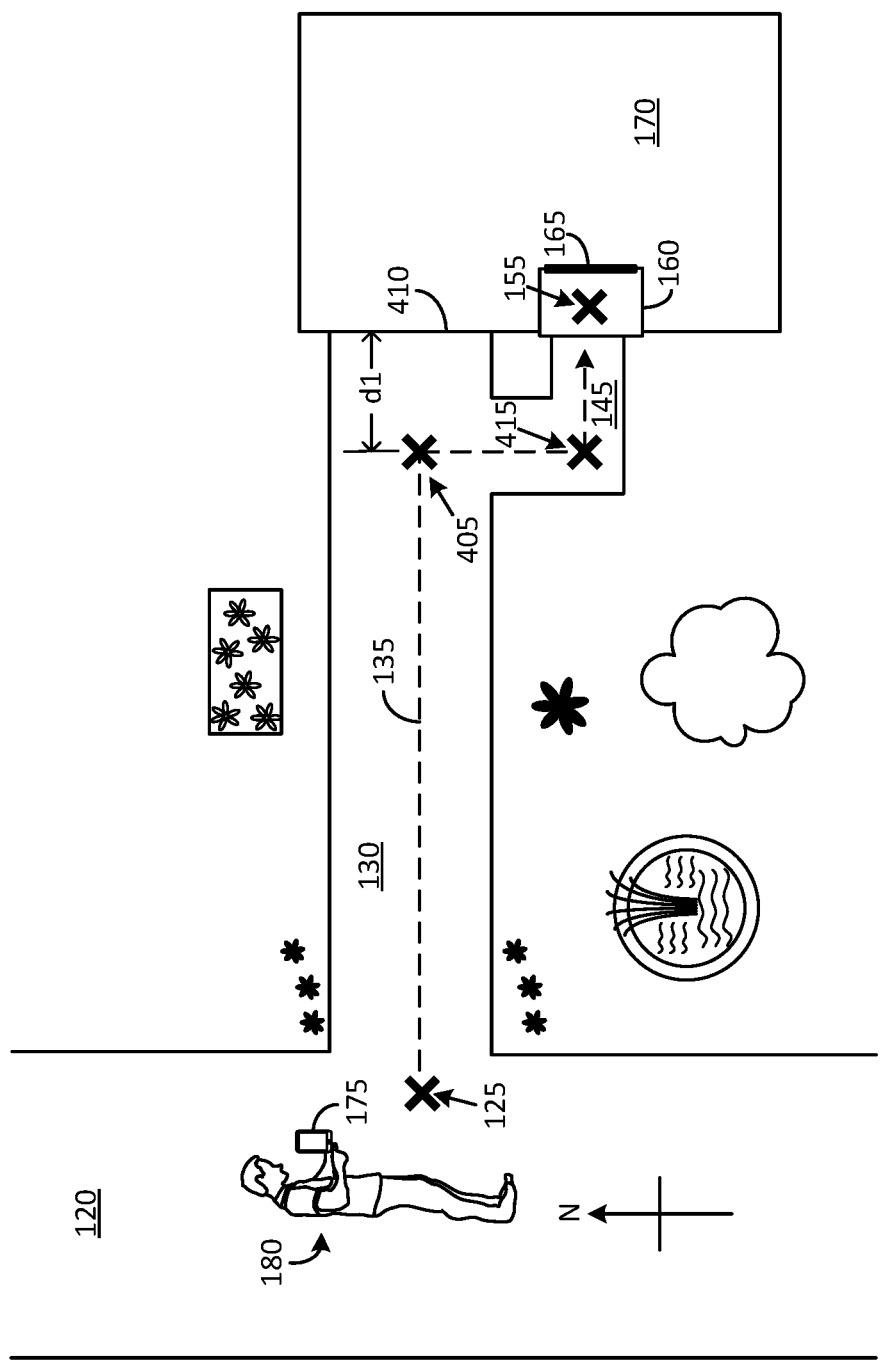
FIG. 4 illustrates a first example procedure for recording a video clip that can be used to generate a digital travel route for a delivery robot in accordance with an embodiment of the disclosure.

FIG. 4 illustrates an example procedure for recording a video clip that can be used to generate a digital route map for the delivery robot 105 in accordance with an embodiment of the disclosure. The operations described below with reference to FIG. 4 is an elaboration of the actions described above with reference to block 310 of FIG. 3.

The individual 180 may launch the software application in the personal communications device 175 when the individual 180 is ready to follow instructions. The instructions provided by the software application may be displayed in text form on a display screen of the personal communications device 175 and/or as voice instructions through a speaker of the personal communications device 175. The first instruction may recommend that the individual 180 position himself/herself at a spot on the sidewalk 120 from where the delivery robot 105 is expected to enter the premises in which the building 170 is located. In some cases, the software application may recommend a pre-defined spot on the sidewalk 120. The pre-defined spot may, for example, be a spot on the sidewalk 120 at which the delivery robot 105 is offloaded from a delivery truck. The pre-defined spot may be indicated to the individual 180 in various forms such as, for example, in the form of GPS coordinates, in the form of an x-mark on a map, and/or in the form of a landmark.

In the illustrated example, the individual 180 responds to the first instruction by positioning himself/herself at the origination spot 125 on the sidewalk 120. The software application may then instruct the individual 180 to initiate a video recording and start walking along a desired walking path, which in this example, is the travel route 135. In an example scenario, the software application may also instruct the individual 180 to provide an audio commentary and/or audio cues, that may be helpful for use by the delivery robot 105 when moving on the travel route 135. The audio commentary and/or audio cues may be used later on by the delivery robot 105 in lieu of, or in cooperation with, the video recording, when the delivery robot 105 is delivering the product.

In another example scenario, the software application may recommend to the individual 180, various settings that may be applied to the camera 240 of the personal communications device 175 and/or various positions and/or orientations for holding the personal communications device 175 when executing the video recording. The various positions and/or orientations can correspond to settings and orientations of a camera provided in the delivery robot 105 such as, for example, the camera 101.

The individual 180 starts the video recording and starts moving along the travel route 135. In one case, the software application may record a video clip and concurrently store information obtained from the personal communications device 175 such as, for example, GPS coordinates, internal measurement unit (IMU) parameters, and camera intrinsic settings.

Upon reaching a first intermediate spot 405, the individual 180 turns south and starts walking towards a second intermediate spot 415 on the walkway 145. In an example scenario, the first intermediate spot 405 may be identified for assisting the delivery robot 105 make the turn. The assistance may be input into the software application in various ways. In a first instance, the first intermediate spot 405 may be automatically identified by a detection device in the personal communication device 175, possibly in the form of a distance "d1" from a garage door 410 of the building 170. In a second instance, the first intermediate spot 405 may be identified by the software application detecting and storing the GPS coordinates of the first intermediate spot 405. In a third instance, the first intermediate spot 405 may be identified by specifying a landmark located nearby (a tree, a bush, a lamp post, etc.). In a fourth instance, the first intermediate spot 405 may be identified by an audio cue provided by the individual 180, such as, for example, "Turn right upon reaching a spot where the walkway is visible on the right."

Upon reaching the second intermediate spot 415, the individual 180 turns east and starts walking towards the stoop 160 on which the package drop-off spot 155 is located. The second intermediate spot 415 may also be input into the software application in various ways such as by way of the examples provided above.

Upon completion of the video recording by the individual 180, and/or during video recording by the individual 180, the software application may convert the recorded video clip into a visual feature map by use of various procedures such as, for example, simultaneous localization and mapping (SLAM) procedures. Conversion of the video clip into the digital route map may include procedures such as, for example, conversion of the video clip into a topological map with trajectory links and storing of various poses.

In an example implementation, the digital route map may be implemented in the form of a trajectory that may be extracted from the visual feature map. The delivery robot 105 may use a standard visual feature mapping procedure and/or a path following algorithm to follow the trajectory when delivering the product.

Figure 5:
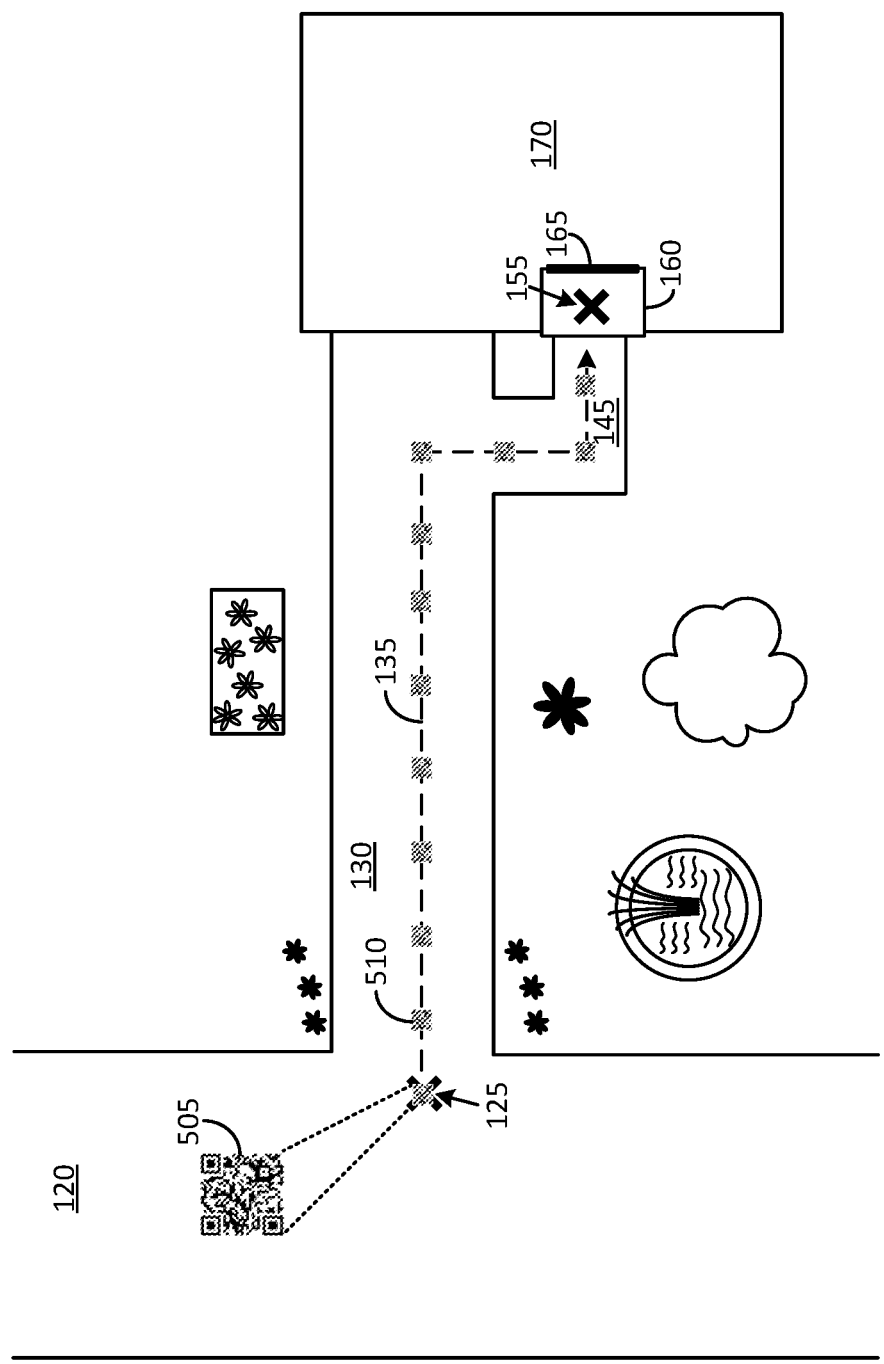
FIG. 5 illustrates a second example procedure for providing travel route information to a delivery robot in accordance with an embodiment of the disclosure.

FIG. 5 illustrates another example procedure for providing travel route assistance to the delivery robot 105 in accordance with an embodiment of the disclosure. The operations performed as a part of this procedure may be carried out in addition to, or in lieu of, the procedure described above vis-à-vis recording of a video clip by the individual 180. In this example procedure, the individual 180 identifies the travel route 135 for the delivery robot 105 by use of one or more markers. Various types of markers may be used for this purpose such as, for example, barcode matrix stickers, quick response (QR) code stickers, and AprilTag® stickers.

In an example implementation of this embodiment, the individual 180 may affix a marker on the sidewalk 120 or the driveway 130, such as, for example, a QR code sticker 505 that is affixed on the driveway 130 at the origination spot 125. The delivery robot 105 may utilize a camera, such as, for example, the camera 101, to locate the QR code sticker 505. The delivery robot 105 may then evaluate the QR code sticker 505 to identify the travel route 135. Identifying the travel route 135 may involve accessing travel route information stored in the cloud (storage device 226, for example). The travel route information may be stored in the storage device 226 in various forms such as, for example, in the form of a sequence of GPS coordinates (including GPS coordinates of the first intermediate spot 405 and the second intermediate spot 415).

In another example implementation of this embodiment, the individual 180 may affix a set of markers on the sidewalk 120, the driveway 130, and the walkway 145 (as illustrated in FIG. 5). Some or all of the set of markers can be markers such as, for example, barcode matrix stickers, quick response (QR) code stickers, and AprilTag® stickers. However, in some scenarios, some or all of the markers may be "dumb" markers such as, for example, reflective stickers or colored tags.

The delivery robot 105 may utilize a camera, such as, for example, the camera 101, to locate the QR code sticker 505 (or a dumb marker, if used). After locating the QR code sticker 505, the delivery robot 105 locates another QR code sticker 510 (or dumb marker, if used) that has been placed adjacent to the QR code sticker 505, and starts moving along the travel route 135 by sequentially identifying other QR code stickers (or dumb markers). In some cases, the location of the markers may be identified by obtaining pose information stored in the QR code sticker 505 or elsewhere (in cloud storage, for example). In some other cases, the location of the markers may be identified by GPS coordinates provided to the delivery robot 105 from cloud storage or pre-programmed into the delivery robot 105.

The individual 180 may change the location of some or all of the markers in order to modify the travel route 135 if he/she so desires. Modification of the travel route 135 may be carried out for example, if some aspects of the travel route 135 have changed (a new walkway path is constructed, a tree is planted, etc.) or the package drop-off spot 155 is changed.

The delivery robot 105 may store information pertaining to the location of the one or more stickers that define the travel route 135 for use when making product deliveries in the future.

Figure 6:
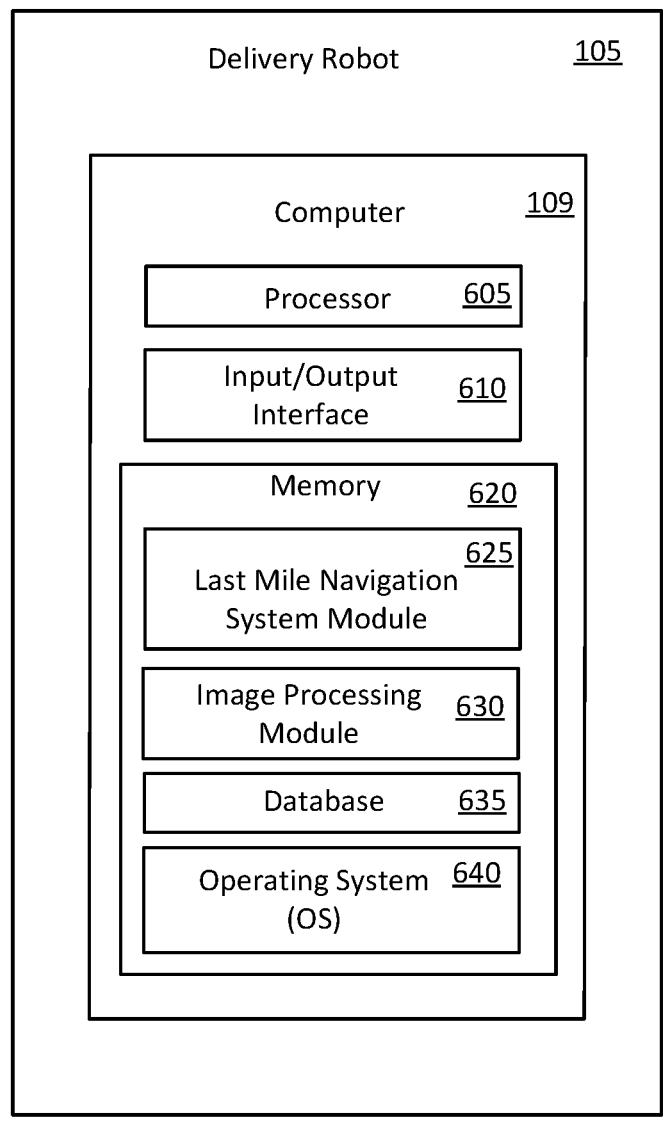
FIG. 6 shows some example components that may be included in a computer that is a part of a delivery robot in accordance with an embodiment of the disclosure.

FIG. 6 shows some example components that may be included in the computer 109 that is a part of the delivery robot 105, in accordance with an embodiment of the disclosure. The computer 109 may include various components such as, for example, a processor 605, an input/output interface 610, and a memory 620. The input/output interface 610 can be used to allow various types of signals and information to pass into, or out of, the computer 109. For example, the input/output interface 610 may be used by the computer 109 to receive signals and data from various sensors and detectors of the delivery robot 105. Thus, the computer 109 can obtain images from the camera 101 and/or signals from the ultrasonic sensor 108. As another example, the input/output interface 610 may be used by the computer 109 to receive various types of commands and signals from the personal communications device 175. The commands and/or signals may be associated with operating the delivery robot 105 for conducting operations in accordance with the disclosure.

The memory 620, which is one example of a non-transitory computer-readable medium, may be used to store an operating system (OS) 640, a database 635, and various code modules such as a last mile navigation system module 625 and an image processing module 630. The code modules are provided in the form of computer-executable instructions that are executed by the processor 605 to enable the computer 109 perform various operations in accordance with the disclosure. The last mile navigation system module 625 can be executed for example, by the processor 605, to perform various operations in accordance with the disclosure. Some example operations can include controlling the delivery robot 105 when traversing a travel route provided by the individual 180, executing audio cues provided by the individual 180, identifying markers placed on a traversable surface on a frontage area of the premises on which the building 170 is located, and/or executing a package delivery in accordance with a video clip, audio instructions, and/or markers.

Execution of some of these operations can include the use of the image processing module 630 in order to evaluate various type of images (such as a video clip and/or images provided by the individual 180) and can also include using reference materials such as, for example, a reference topographic map, a reference terrain map, a reference graphical representation of the premises, a reference graphical representation of the building 170, a reference digital rendering of the building 170, and/or a reference digital rendering of an object on the premises. The reference materials may be stored in the database 635.

Figure 7:
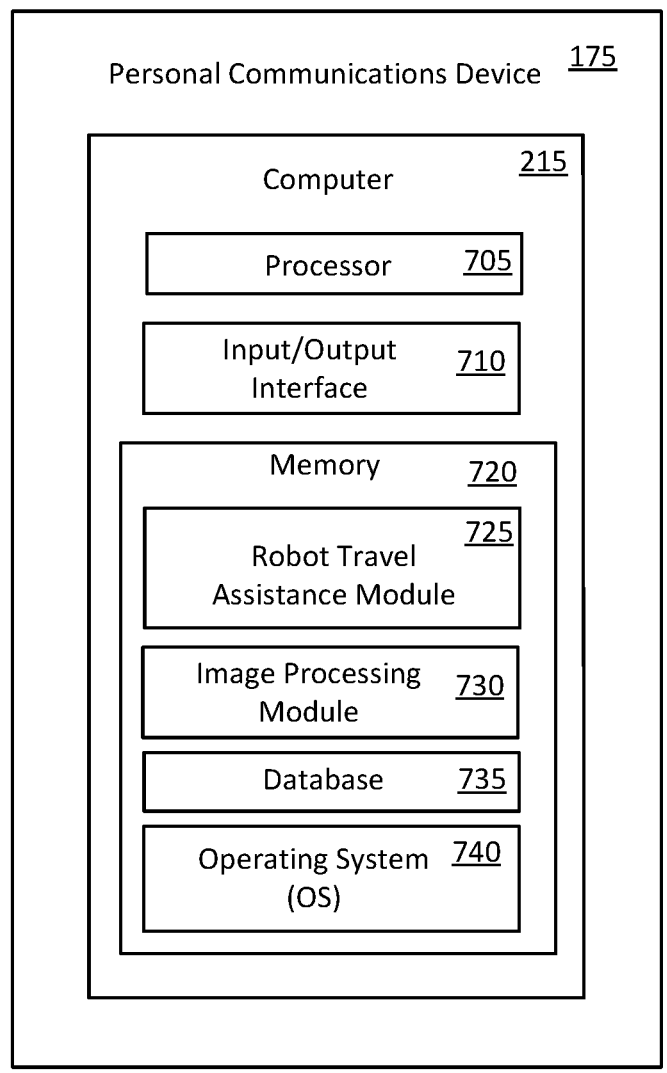
FIG. 7 shows some example components that may be included in a computer that is a part of personal communications device in accordance with an embodiment of the disclosure.

FIG. 7 shows some example components that may be included in the computer 215 that is a part of the personal communications device 175 of the individual 180, in accordance with an embodiment of the disclosure. The computer 215 may include various components such as a processor 705, an input/output interface 710, and a memory 720. The input/output interface 710 can be used to allow various types of signals and information to pass into and/or out of the computer 215. For example, the input/output interface 710 may be used to allow signals from the communication system 210 and/or images from the camera 240, to be received by the computer 215.

The memory 720, which is another example of a non-transitory computer-readable medium, may be used to store an operating system (OS) 740, a database 735, and various code modules that can be downloaded into the personal communications device 175 such as, for example, a robot travel assistance module 725 and an image processing module 730. The code modules are provided in the form of computer-executable instructions that are executed by the processor 705 to enable the computer 215 perform various operations in accordance with the disclosure. For example, the robot travel assistance module 725 can be executed by the processor 705 to perform operations such as, for example, generating a video clip of the travel route 135 that is preferred by the individual 180 for receiving packages delivered by the delivery robot 105, and for online processing of the video clip.

The database 735 can be used to store materials such as, for example, a digital route map, an image of a frontage area of a property, and audio cues. Some of the material stored in the database 735 may be unavailable elsewhere. Other material stored in the database 735 may be obtained by the computer 215 from storage device 226 or from the database 635 of the delivery robot 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 620 and the memory 720, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    generating travel route information associated with a package delivery location, the travel route information interpretable by a delivery robot; and
    using the travel route information, by the delivery robot, to deliver a package to a package drop-off spot at the package delivery location,
    wherein generating the travel route information comprises:
        generating a video clip of a travel route from an origination spot at the package delivery location to the package drop-off spot at the package delivery location; and
        converting the video clip to a digital route map that is interpretable by the delivery robot for delivering the package to the package drop-off spot.

2. The method of claim 1, further comprising:
    extracting metadata associated with the video clip; and
    using the digital route map and the metadata, by the delivery robot, to travel from the origination spot at the package delivery location to the package drop-off spot at the package delivery location.

3. The method of claim 1, wherein the delivery robot is a terrestrial delivery robot and wherein generating the video clip comprises:
    an individual traversing the travel route while capturing the video clip on a personal communications device.

4. The method of claim 3, further comprising:
    converting, by the personal communications device, the video clip to the digital route map; and
    transmitting, by the personal communications device, to a server computer, the digital route map and a purchase order for the package.

5. The method of claim 1, wherein generating the travel route information comprises:
    capturing an image of a traversable area at the package delivery location; and
    generating, based on contextual content present in the image, a digital route map that is interpretable by the delivery robot for delivering the package to the package drop-off spot.

6. The method of claim 1, wherein the delivery robot is a terrestrial delivery robot, and wherein generating the travel route information comprises:
    placing a set of markers on a surface of a traversable area at the package delivery location, the set of markers trackable by the terrestrial delivery robot to move from an origination spot at the package delivery location to the package drop-off spot at the package delivery location.

7. The method of claim 6, wherein each of the set of markers is a quick response (QR) code sticker, and wherein placing the set of markers on the surface of the traversable area at the package delivery location comprises affixing each QR code sticker on a ground surface in an arrangement that is operative as a visual travel route guide for the terrestrial delivery robot.

8. A method comprising:
    generating travel route information associated with a package delivery location, the travel route information interpretable by a delivery robot; and
    using the travel route information, by the delivery robot, to deliver a package to a package drop-off spot at the package delivery location,
    wherein generating the travel route information comprises:

capturing an image of a traversable area at the package delivery location; and generating, based on contextual content present in the image, a digital route map that is interpretable by the delivery robot for delivering the package to the package drop-off spot.

9. A method comprising:

generating travel route information associated with a package delivery location, the travel route information interpretable by a delivery robot; and using the travel route information, by the delivery robot, to deliver a package to a package drop-off spot at the package delivery location, wherein the delivery robot is a terrestrial delivery robot, and wherein generating the travel route information comprises:

placing a set of markers on a surface of a traversable area at the package delivery location, the set of markers trackable by the terrestrial delivery robot to move from an origination spot at the package delivery location to the package drop-off spot at the package delivery location.

\* \* \* \* \*